Sept. 18, 1951  O. M. CHRISTENSEN  2,568,319
ELECTRONIC FREQUENCY DIVIDER APPARATUS
EMPLOYING DELAY CIRCUITS
Filed July 21, 1943

*INVENTOR.*
ORLAND M. CHRISTENSEN
BY
*M. O. Hayes*
*ATTORNEY*

Patented Sept. 18, 1951

2,568,319

UNITED STATES PATENT OFFICE 2,568,319

ELECTRONIC FREQUENCY DIVIDER APPARATUS EMPLOYING DELAY CIRCUITS

Orland M. Christensen, Cambridge, Mass., assignor, by mesne assignments, to the United States of America as represented by the Secretary of the Navy Application July 21, 1943, Serial No. 495,667

13 Claims. (Cl. 250—27)

1

The present invention relates to improvement in the methods and circuits for frequency division in electronic apparatus.

Multivibrators, and other comparable circuits, have long been used for obtaining the division of a given frequency. These forms of frequency dividers are quite accurate in performance over a limited frequency range of operation. When the range of operation is extended too far with this form of circuit, the accuracy falls off considerably. A primary reason for this limitation lies in the exponential discharge characteristic of the control grid time constant circuit of a multivibrator the inaccuracy of which is enhanced by any tendency of the input signal, which is to be divided in frequency, to vary in amplitude. This invention is directed toward eliminating this difficulty and providing a wide-range frequency divider the accuracy of which is substantially independent of variations in amplitude of the input signal.

The invention is also intended to provide such a frequency divider as has been previously described which is further adapted to cause synchronization of the divided frequency with a slower, repeating voltage wave in related circuits, the full significance of which will be later described.

Figure 1:
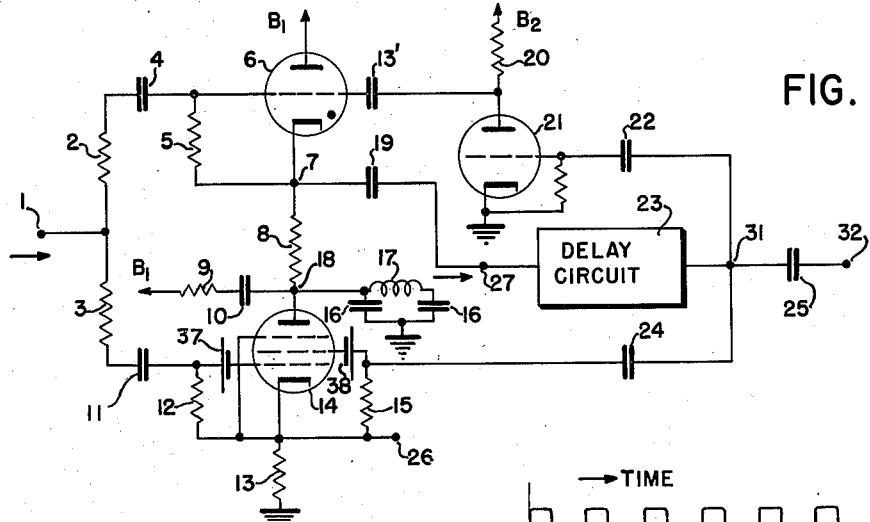
Figure 2:
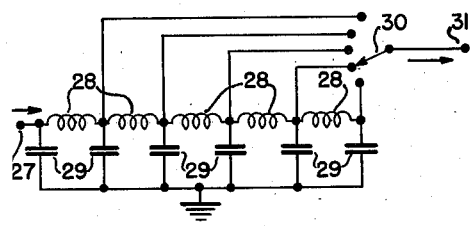
Figure 3:
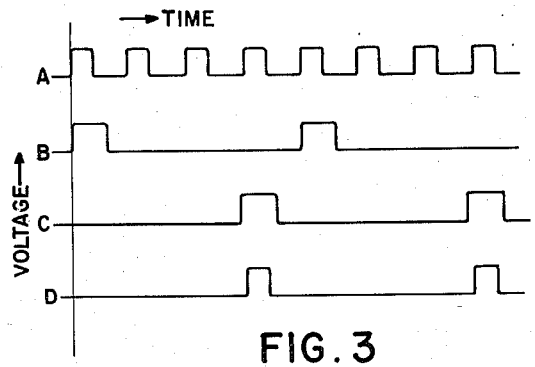
Figure 4:
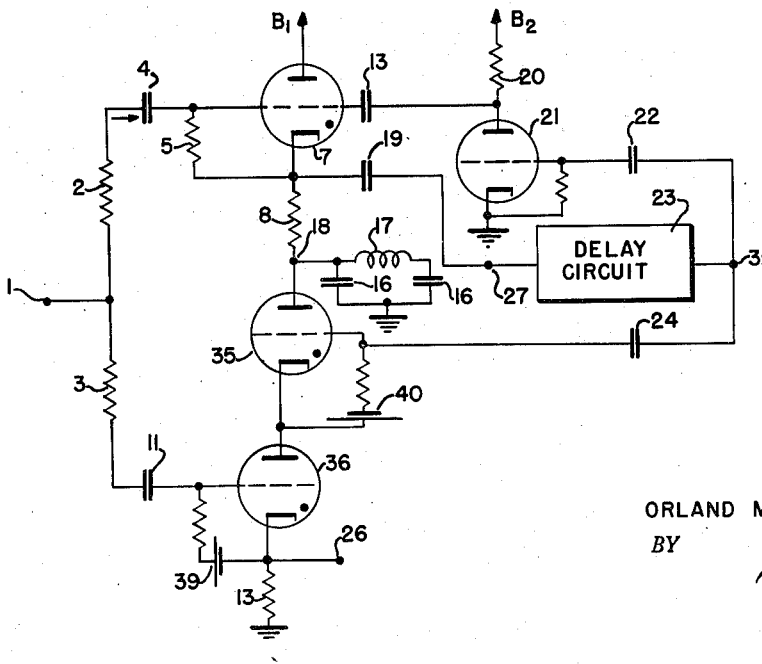

In the accompanying drawings, Fig. 1 illustrates an embodiment of the invention. Fig. 2 illustrates one form of delay circuit which may be used in the invention, while Fig. 3 is a voltage-time diagram intended to describe the operation of the invention. Fig. 4 shows a modification of the circuit in Fig. 1.

In Fig. 1, point 1 represents the input terminal to the frequency divider, while point 26 represents the output terminal. Multi-grid tube 14 is connected in a coincidence type of circuit, in which the tube will conduct providing its plate is connected to a source of high positive potential, and its control and screen grids both have suitable positive signals existing on each at the same time. Only during the time when these three conditions are concurrent will tube 14 conduct. Tube 14 further is connected in a cathode follower circuit in which one end of resistance 13 is connected to the cathode of the tube and the other end is connected to ground. The voltage across this resistance provides the output voltage at point 26. Resistance 12 provides the control grid return path for tube 14 while resistance 15 provides the screen grid return path for that tube. Bias voltages may be inserted in the return paths of these grids as indicated at 37 and 38. The control grid of tube 14 is excited from the source of signals which are applied thereto from point 1 through resistance 3 which is connected in series with coupling condenser 11. The screen grid of the tube may be coupled to the output of delay circuit 23 through coupling condenser 24.

2

The positive plate voltage supply for tube 14 is obtained from the energy stored in condensers 16 which may be included in a pulse-forming network comprising these condensers and inductance 17. This network may be connected to the plate of tube 14 and also to one end of resistance 8. The other end of resistance 8 may be connected to the junction point 7 of the grid return resistance 5 of gas tube 6, the cathode of gas tube 6, and condenser 19 which couples voltage changes at point 7 to the delay circuit 23.

The input signals applied at point 1 are coupled to the grid of gas tube 6 through resistance 2 and coupling condenser 4. The plate of this tube is connected to a suitable source of positive potential such as B. The grid of tube 6 may be appropriately blanked at the proper time with a negative pulse from the plate circuit of the inverting stage comprising tube 21. Tube 21 inverts the polarity of the output pulse from the delay circuit 23. The plate of tube 21 is connected to a suitable source of positive potential $B_2$ through load resistor 20, and the cathode thereof is grounded.

In describing the operation of the circuit in Fig. 1, reference will be made to the diagram of Fig. 3. For purposes of explanation, it will be assumed that the frequency-dividing circuit is to produce a series of output pulses, such as at D of Fig. 3, when a series of input pulses, such as at A, are applied to the input terminal 1 of the circuit. The voltage wave-form of plot B in Fig. 3 approximately represents that existing at point 27 in Fig. 1, while plot C may represent the voltage form which may exist at point 31, the output of delay circuit 23. In the instance taken, the frequency of the voltage pulses applied at point 1 is divided by a factor of 4 to give the output voltage pulses at point 26.

In the operation of the circuit the first of the series of voltage pulses applied at point 1 causes gas tube 6, which is normally inoperative, to conduct causing nearly the full potential of the $B_1$ supply source to appear between point 7, at the cathode of tube 6, and ground. Gas tube 6 may thus be considered as a switching control. The circuit comprising resistance 8 connected in series with the mentioned pulse-forming network may be provided for the purpose of sharpening the leading edge of the voltage pulse occurring at point 27. The voltage pulse results from the charging of condensers 16 in the pulse-forming network. A sharp leading edge to this pulse improves the precision in timing of the delay function which will be subsequently described. At the same time that gas tube 6 is conducting as a result of the positive pulse at its grid, a positive pulse exists at the control grid of tube 14. Tube 14 does not conduct at this time, however, since the positive pulse produced at point 27 has not yet reached the screen grid of tube 14 through the delay circuit. Tube 6 will continue to conduct, irrespective of signals upon its grid, until condensers 16 are charged to the point where the difference between the potential across their terminals and the potential of the B₁ supply source is approximately equal to the deionization potential of the tube 6; thereafter, tube 6 will not conduct further until condensers 16 have discharged despite the continued occurrence of positive pulses at its grid from point 1.

Tube 6, the reactive network including the condensers 16 and associated resistors, etc., may be regarded as a pulse-forming circuit. This circuit, after the discharge of the condensers 16 through the coincidence circuit comprising tube 14, operates upon the next input pulse on the grid of tube 6 to form an output pulse as the condensers 16 charge, which output pulse excited delay circuit 23.

The positive pulse, existing at point 27 initially is delayed a controlled amount in delay circuit 23, and at the termination of this delay it appears at the screen grid of tube 14. By causing the delay time of circuit 23 to be properly adjusted, such that this output pulse at point 31 appears on the screen grid of tube 14 at the same time that one of the subsequent input pulses appears on the control grid, tube 14 will discharge condensers 16 through resistance 13, and provide a positive pulse at point 26. The network comprising inductance 17 and condensers 16 may be adapted to provide an approximately rectangular voltage pulse across resistance 13, such as at D of Fig. 3. If this pulse shape is of little importance a single condenser may be used in place of this pulse-forming network. The time delay in circuit 23 may be adjusted to an amount such that the output pulse therefrom appearing at point 31 exists for a time interval which includes the time interval occupied by a desired pulse appearing at the input terminal 1. A voltage plus is formed across resistor 13 each time a pulse at point 1 occurs in time coincidence with the pulse at point 31. By controlling the delay in circuit 23 the frequency of the output pulses from the circuit may be controlled.

It will be noted that if the inverting circuit comprising tube 21 were not provided, gas tube 6 would conduct at the same time as tube 14 conducts, namely at the occurrence of an output pulse at point 26. This would impair the pulse-forming function of the network comprising condensers 16 upon the charging thereof, which might prevent the generation of a suitable pulse for application to the delay circuit 23. As the circuit is connected, the output pulse from delay circuit 23 is applied through coupling condenser 22 to the grid of tube 21, and this pulse is of a positive nature. A negative pulse will thus be formed at the plate of tube 21 and coupled through condenser 13' to the grid of tube 6, and will prevent the latter tube from firing during the existence of the output pulse at point 26. Since the pulse at the plate of tube 21 has terminated before the occurrence of the next input pulse at point 1, tube 6 will again fire at this mentioned next input pulse.

The shape of the output voltage pulses at point 26 may be considered to depend upon three factors; (1) the characteristics of the pulse-forming network comprising condensers 16 and 17, (2) the shape of the voltage pulse applied to the screen grid of tube 14, and (3) the shape of the voltage pulse applied to the control grid of tube 14. In proper circuit design, these components may be made to produce any one of a variety of possible shapes of output voltage pulses at point 26. However it is possible to modify a certain portion of the circuit somewhat and obtain an output pulse shape which may be determined substantially by the characteristics of the pulse-forming network. In such a circuit two gas discharge tubes 35 and 36 may be connected in series in place of tube 14, as in Fig. 4. The plate of the gas tube 35 may be conected to point 18, while its grid may be connected through condenser 24 to point 31, and its cathode connected directly to the plate of the tube 36. The grid of the tube 36 may be connected through coupling condenser 11 and resistor 3 to a point 1, the input terminal to the system, while the cathode of the tube 36 may be conected to one side of resistance 13 and the output point 26. Suitable bias voltages may be inserted in the grid return leads of these two gas tubes as indicated at 39 and 40. In this arrangement neither gas tube will conduct until there is a coincidence in the time of existence of the voltage pulses occurring at the grids of both gas tubes and at such a time both tubes will conduct together and their resistance drop may be very small and substantially constant throughout the discharge of the pulse-forming network.

A number of circuits may be used in performing the delay function of delay circuit 23. One such circuit is shown in the diagram of Fig. 2, in which point 27 is the input terminal and point 31 is the output terminal. This form of delay network is well known and consists of a series of pi-section elements comprising inductances 28 and condensers 29. Adjustable delay may be obtained by contactor 30 which connects the output terminal 31 to the junction of any two adjacent pi-sections, according to the delay desired. Another suitable delay circuit for the purpose may be of the type disclosed in an application by Britton Chance, Serial No. 512,931, filed December 4, 1943, and entitled "Pulse Generating Circuit," now Patent No. 2,562,660, which may be described as a precision delay multivibrator. In the application of this circuit the output pulse from the precision delay multivibrator may be differentiated in a suitable RC circuit whereby the trailing edge of this pulse is caused to trigger a suitable pulse generating circuit, such as a form of blocking oscillator, the output of which may be applied to the control grid of tube 21 and the screen grid of tube 17, or the control grid of the first thyratron if the gas tube arrangement is used in the coincidence circuit. Any number of these delay multivibrators may be connected in cascade depending upon the delay time desired.

The pulse-forming network comprising condensers 16, and inductance 17 may be any of a number of suitable types, but the type indicated in Fig. 1 is suitable. For best operation, however, the impedance seen from point 18 through tube 14 and resistor 13 to ground may be substantially the characteristic impedance of this network when tube 14 is conducting. In the event thyratrons are employed in the coincidence circuit, resistance 13 may be substantially that characteristic impedance, since the resistance of the gas tubes is very low. Resistances 2 and 3 may be provided for the purpose of preventing too large a portion of the negative gate which is applied from the plate of tube 21 to the grid of tube 6 from reaching the grid of tube 14. It will be noted that although the input pulses at point 1 experience a certain voltage drop in these resistors 2 and 3 that the gate from the plate of tube 21 experiences a voltage drop from the two resistances connected in series. Condenser 4 may be made small and resistance 5 large to the end of producing a sharp impulse concurrent with the initial portion of each input pulse occurring at point 1. This enhances the accuracy of timing of the initiation of the voltage pulse which appears at point 27 upon conduction in gas tube 6. The amplitude of the gate pulse applied to the grid of tube 6 should be such that it is sufficient to prevent this tube from conducting and yet is of low enough amplitude when reduced through resistances 2 and 3 so as not to impair the operation of tube 14.

As has been mentioned previously the circuit of Fig. 1 is adaptable to being synchronized with a repeating function in an associated circuit, the frequency of this function being lower than the frequency of the output pulses of the frequency divider. In other words, with the input pulses at point 1 occurring at a given frequency and with the output pulses at point 26 being at another, slower given frequency, it is often desirable to cause the first of a series of pulses occurring at point 26 to coincide with a pulse occurring at point 32. An example of such an application exists in the cathode ray tube indicators of radio detection systems where it is desired to cause the first of a series of range-marking pulses, such as those appearing at point 26 in Fig. 1, to occur at the same instant of time as the transmitted pulses of ultra-high-frequency energy from the system antenna. Assuming a continuous series of pulses to exist at point 1, this synchronization may be accomplished by applying a suitable positive pulse to point 31 of Fig. 1 through condenser 25, which is initiated with the initiation of a pulse of transmitted energy from the detection system. In such a radio detection system the frequency of the transmitted pulses is a sub-multiple of the frequency of the pulse generator connected to point 1 of Fig. 1 and is synchronized regularly therewith such that the transmitted pulses are caused to occur repeatedly at the inception of certain pulses appearing at point 1. The pulses generated by the source connected to point 1 may act as a synchronizing means for the modulating circuit of the transmitter of such a radio detection system, and the pulses of radiation from the system need not, and probably will not, occur at a sub-multiple of the frequency of the pulses occurring at point 26 of Fig. 1. Certain of the essential elements to understanding the portion of a radio detection system of concern in this invention have been described somewhat in an invention of Hite and Whitham, Patent No. 2,444,890, and entitled "Self-synchronous Frequency Divider," which is another type of frequency-dividing circuit.

In the application of Fig. 1, for providing pulses for placing range markers on the screen of a cathode ray tube, as mentioned, situations may arise where it is desirable to cause the source of pulses connected to point 1 to be initiated with a remotely controlled oscillator which also initiates the main transmitted pulses of the system simultaneously, and the pulses at point 1 may exist only for a certain early portion of the time interval between successive transmitted pulses from the system antenna, as will the divided-frequency pulses at point 26. In such a case condensers 16 of the pulse-forming network at the plate of tube 14 may not be charged to the necessary potential, since tube 6 will not have been conducting for some time before the initiation of the next transmitted pulse or the pulses at point 1. This may be managed by connecting condenser 10 and resistor 9 in series between point 18 and a suitable source of positive potential such as $B_1$ in the manner indicated in Fig. 1. Condenser 10 may be made much larger than the sum of condensers 16 in parallel such that when the transient flow of charging current of the circuit consisting of resistance 9, condenser 10, and condensers 16 is completed practically the full potential of the $B_1$ supply will exist across condensers 16. In this way condensers 16 will be charged and ready to cause plate to flow current in tube 14 at the proper time. The time constant of the circuit comprising resistor 9, capacitor 10, and that of the pulse-forming network comprising inductance 17 and condensers 16, is long enough that current from the external source of potential has no effect upon the normal operation of the circuit when a series of pulses exists at point 1. Resistor 9 has a current-limiting function and may, if desired, be replaced by other types of current-limiting impedances, such as a choke, or a choke and resistor in series.

One may readily observe the independence of the accuracy of the frequency dividing operation performed by the means of the invention from moderate variations in amplitude of the original, higher frequency wave. The accuracy of the operation may be further enhanced by causing the pulses at point 27 to be of a time duration slightly less than the time interval between successive pulses at point 1, whereby the effect of moderate variations in the timing of the delay circuit 23 may be minimized. It may be further observed that the invention is adapted to frequency divide substantially any repetitive voltage wave form and that the instance taken is merely a special case adapted to facilitate the description.

It is true that there are other modifications and slight differences which may exist in the means of physically realizing the advantages of my invention without departing from the fundamental principles thereof, and I do not wish to limit myself to the description of the specific circuits herein described except as in the appended claims.

What I desire to claim and secure by Letters Patent of the United States is:

1. Electronic frequency dividing apparatus including a coincidence circuit having first and second inputs and adapted to produce an ouput pulse when voltage pulses are provided simultaneously to both of said inputs, the first of said inputs being connected to a source of a voltage wave of a frequency to be divided, a pulse forming circuit including at least one reactive element and a gas discharge tube serially connected between a source of energy and a point of reference potential, means connecting an intermediate point of said serial connection to said coincidence circuit, said pulse forming circuit being connected to release energy through said coincidence circuit when said coincidence circuit produces an output pulse and to accept and store energy upon the first positive cycle of said voltage wave following such release of energy as aforesaid, delay circuit means connected to said pulse forming circuit for excitation at the time of said acceptance of energy by said pulse forming circuit means and adapted to produce a delayed pulse as a result of such excitation, means for controlling the delay of said delay circuit means, means for coupling delayed pulses produced by said delay circuit means to the second input of said coincidence circuit and means connecting said delay circuit means to said gas discharge tube of said pulse forming circuit for preventing conduction in said gas discharge tube during the production of an output pulse by said coincidence circuit.

2. Electronic frequency-dividing apparatus comprising, a source of repeating voltage wave to be frequency-divided, a vacuum tube having at least an anode, a cathode, and two grids, said tube being adapted to operate in a coincidence circuit in which said two grids comprise two input-control means, said source being connected to one of said grids, a delay circuit having an output connected to the other of said grids, a gas tube having at least an anode, a cathode and a control grid, said last-mentioned grid being connected to said source, a source of potential having positive and negative terminals, said last-mentioned anode being connected to said positive terminal, said first-mentioned cathode being connected through a resistor to said negative terminal, and said last-mentioned cathode being connected to the input of said delay circuit, a reactive pulse-forming network connected to said last-mentioned cathode and to said first-mentioned anode and being adapted to store energy conducted thereto from said source of positive potential by said gas tube as initiated by the positive portion of the first cycle of said repeating wave, during said storage of energy said pulse-forming means being adapted to provide a positive pulse to said delay means, said delay means being adapted to delay said pulse a controlled amount and apply said pulse so delayed to said one of said grids in time coincidence with the appearance of the positive portion of a selected cycle of said repeating wave appearing at the said other of said grids, said coincidence circuit being adapted to discharge said energy stored in said pulse-forming means during said time coincidence and produce an output pulse across said resistor from said discharge, an inverting amplifier having an output connected to the control grid of said gas tube and an input connected to the output of said delay means, and adapted to invert said delayed positive pulse and apply said pulse so inverted to said grid of said gas tube to render said gas tube nonconductive during said time coincidence, said gas tube being adapted, by reason of circuit connections, to be caused to conduct and form a pulse upon the next cycle of said repeating voltage wave following said time coincidence and thereby to begin another frequency-division cycle.

3. Electronic frequency-dividing apparatus in accordance with claim 1 in which the coincidence circuit there specified includes a multi-element vacuum tube having a cathode and an anode and at least two grids, said grids being respectively coupled to said first and second input of said coincidence circuit, said cathode being connected to the negative terminal of a source of steady voltage, said cathode being also connected to an output terminal adapted to provide output pulses of said coincidence circuit, and said anode being connected to said pulse-forming circuit.

4. Electronic frequency-dividing apparatus in accordance with claim 1 in which the coincidence circuit there specified includes a first and a second gas discharge tube each having, at least an anode, a cathode and a control grid, said first gas discharge tube having its cathode connected to an output terminal adapted to provide output pulses of said coincidence circuit and connected through a resistor to the negative terminal of a source of relatively steady voltage, the anode of said first gas discharge tube being connected to said pulse-forming circuit, and the control grids of said gas discharge tubes being respectively associated with the first and second inputs of said coincidence circuit which are related to other elements of said electronic frequency-dividing apparatus as specified in claim 1.

5. Electronic frequency-dividing apparatus in accordance with claim 1 in which the said second input of said coincidence circuit, is additionally coupled to a source of synchronizing pulses, whereby release of energy through said coincidence circuit from said reactive network is adapted to be caused during a positive cycle of said voltage wave occurring during a synchronizing pulse and additional output pulses of said coincidence circuit may be produced at predetermined intervals in arithmetic progression with reference to the time of such synchronizing pulse.

6. Electronic frequency-dividing apparatus including a coincidence circuit having a first and a second input and adapted to produce an output pulse when voltage pulses are provided simultaneously to both of said inputs, the first of said inputs being connected to a source of a voltage wave of a frequency to be divided, a pulse-forming circuit including at least one reactive element and a gas discharge tube, means connecting said pulse-forming circuit to said coincidence circuit, said pulse-forming network being connected to release energy through said coincidence circuit when said coincidence circuit produces an output pulse and to accept and store energy upon the first positive cycle of said voltage wave following such release of energy as aforesaid, delay circuit means connected to said pulse forming circuit for excitation at the time of said acceptance of energy by said pulse-forming circuit means and adapted to produce a delayed pulse as a result of such excitation, means for controlling the delay of said delay circuit means, means for coupling delayed pulses produced by said delay circuit means to the second input of said coincidence circuit, and means connecting said delay circuit means and said gas discharge means for preventing conduction in said gas discharge tube of said pulse-forming circuit during the production of an output pulse by said coincidence circuit, said second input of said coincidence circuit being additionally coupled to a source of synchronizing pulses, whereby said release of energy through said coincidence circuit from said reactive network is adapted to be caused during a positive cycle of said voltage wave occurring during a synchronizing pulse and additional output pulses of said coincidence circuit may be produced at predetermined intervals in arithmetic progression with reference to the time of such synchronizing pulse, means comprising a series condenser and current limiting impedance circuit, interposed between a source of positive voltage and said coincidence circuit and said pulse-forming circuit, said last mentioned means being adapted to provide gradual charging of said reactive network of said pulse-forming circuit in the absence of the provision of pulses to the input of said pulse-forming circuit.

7. Frequency dividing apparatus comprising, a coincidence circuit for producing an output signal when first and second signal voltages are simultaneously applied thereto, a source of voltage at a frequency to be divided, an energy storage circuit and a control tube, means coupling said coincidence circuit to said control tube, means coupling said storage means to said coincidence circuit, means coupling said source to said control tube and said coincidence circuit whereby signals from said source are simultaneously applied to said control tube and said coincidence circuit, a delay circuit coupled to said control tube, means for excluding all but selected signals from said delay circuit, the output of said delay circuit being connected to said coincidence circuit, whereby simultaneous energization of said coincidence circuit from said source and said delay circuit output is operative to produce an output signal of lower frequency than said source voltage.

8. Electronic frequency-dividing apparatus comprising a coincident circuit having first and second inputs thereto, an energy storage device connected to said coincidence circuit for discharge of energy therethrough, said coincidence circuit being adapted to produce said discharge upon the simultaneous application of voltage pulses at said two inputs, said coincidence circuit being further adapted to produce an output signal upon such discharge, a pulse operated charging circuit connected to said energy storage device, a delay circuit coupled to said charging circuit for excitation upon operation of said charging circuit, and adapted to produce a delayed pulse as a result of such excitation, means coupling said delayed pulses to said second input of said coincidence circuit, means coupling said delayed pulses to said charging circuit to render said charging circuit inoperative for the duration of each delayed pulse and means coupling said charging circuit and said first input to said coincidence circuit to a source of voltage pulses of a frequency to be divided.

9. Frequency dividing apparatus as in claim 8, said apparatus further comprising means coupling a source of synchronizing pulses to said second input of said coincidence circuit.

10. Frequency dividing apparatus as in claim 8, said apparatus further comprising means coupling a source of synchronizing pulses to said second input of said coincidence circuit and additional charging means coupled to said energy storage device, said additional charging means having a charging period long compared to a cycle of the frequency to be divided.

11. Electronic frequency-dividing apparatus comprising a coincidence circuit having first and second inputs thereto, a pulse-forming network connected to said coincidence circuit for discharge of energy therethrough, said coincidence circuit being adapted to produce said discharge upon the simultaneous application of voltage pulses at said two inputs, said coincidence circuit being further adapted to produce an output signal upon such discharge, a pulse operated charging circuit connected to said pulse-forming network, a delay circuit coupled to said charging circuit for excitation upon operation of said charging circuit and adapted to produce a delayed pulse as a result of such excitation, means coupling said delayed pulses to said second input of said coincidence circuit, means coupling said delayed pulses to said charging circuit to render said charging circuit inoperative for the duration of each delayed pulse and means coupling said charging circuit and said first input to a source of voltage pulses of a frequency to be divided.

12. Electronic frequency dividing apparatus comprising a coincidence circuit having first and second inputs thereto, a pulse-forming network connected to said coincidence circuit for discharge of energy therethrough, said coincidence circuit being adapted to produce said discharge upon the simultaneous application of voltage pulses at said two inputs, said coincidence circuit being further adapted to produce an output signal upon such discharge, a charging circuit connected to said pulse-forming network, said charging circuit including a grid controlled gas discharge tube controlling the operation of said charging circuit, a delay circuit coupled to said charging circuit for excitation upon operation of said charging circuit and adapted to produce a delayed pulse as a result of such excitation, means coupling said delayed pulses to said second input of said coincidence circuit, means coupling said delayed pulses to said grid of said gas discharge tube to render said charging circuit inoperative for the duration of each delayed pulse and means coupling said grid of said gas discharge tube and said first input of said coincidence circuit to a source of voltage pulses of a frequency to be divided.

13. Electronic frequency dividing apparatus comprising a coincidence circuit having first and second inputs thereto, a pulse-forming network connected to said coincidence circuit for discharge of energy therethrough, said coincidence circuit being adapted to produce said discharge upon the simultaneous application of positive voltage pulses at said two inputs, said coincidence circuit being further adapted to produce an output signal upon such discharge, a charging circuit including a grid controlled gas discharge tube controlling the operation of said charging circuit in response to the application of positive pulses at the grid thereof, a delay circuit, means coupling a pulse from said charging circuit to said delay circuit upon the operation of said charging circuit to excite said delay circuit, said delay circuit being adapted to produce a delayed pulse as a result of such excitation, means coupling said delayed pulses to said second input of said coincidence circuit, means coupling said delayed pulses to said grid of said gas discharge tube to render said charging circuit inoperative for the duration of each delayed pulse, and means coupling said grid of said gas discharge tube and said first input of said coincidence circuit to a source of positive voltage pulses of a frequency to be divided.

ORLAND M. CHRISTENSEN.

REFERENCES CITED

The following references are of record in the file of this patent:

UNITED STATES PATENTS

| Number | Name | Date |
| --- | --- | --- |
| 2,158,285 | Koch | May 16, 1939 |
| 2,212,420 | Harnett | Aug. 20, 1940 |
| 2,221,666 | Wilson | Nov. 12, 1940 |
| 2,252,442 | Schesinger | Aug. 17, 1941 |
| 2,422,204 | Meacham | June 17, 1947 |